United States Patent
Hua et al.

(10) Patent No.: US 9,185,058 B2
(45) Date of Patent: Nov. 10, 2015

(54) METHOD AND APPARATUS FOR PROCESSING GPRS TUNNELING PROTOCOL USER PLANE TRAFFIC IN A CLOUD-BASED MOBILE NETWORK

(71) Applicant: Alcatel Lucent, Boulogne Billancourt (FR)

(72) Inventors: Michael N. Hua, Kanata (CA); Sami Assaad, Ottawa (CA); Camille Bijjani, Gatineau (CA); Manikka Thyagarajan, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 10 days.

(21) Appl. No.: 13/835,821

(22) Filed: Mar. 15, 2013

(65) Prior Publication Data
US 2014/0269533 A1 Sep. 18, 2014

(51) Int. Cl.
*H04L 12/861* (2013.01)

(52) U.S. Cl.
CPC *H04L 49/90* (2013.01); *Y02B 60/50* (2013.01)

(58) Field of Classification Search
CPC ....... H04L 67/16; H04L 67/30; H04L 69/329; H04L 12/4641; H04L 29/01
USPC .............. 370/329, 389–402; 709/229; 726/13
See application file for complete search history.

(56) References Cited

U.S. PATENT DOCUMENTS

| | | | |
|---|---|---|---|
| 7,131,141 B1 * | 10/2006 | Blewett et al. | 726/12 |
| 2002/0038339 A1 * | 3/2002 | Xu | 709/203 |
| 2004/0049701 A1 * | 3/2004 | Le Pennec et al. | 713/201 |
| 2013/0170451 A1 * | 7/2013 | Krause et al. | 370/329 |

FOREIGN PATENT DOCUMENTS

WO WO 2012/167184 12/2012
WO WO 2012167184 A2 * 12/2012

OTHER PUBLICATIONS

Chiosi, M., et al., "Network Functions Virtualisation", SDN and OpenFlow World Congress, Darmstadt-Germany, Oct. 22-24, 2012, Issue 1, pp. 1-16.

(Continued)

*Primary Examiner* — Edan Orgad
*Assistant Examiner* — Emmanuel Maglo
(74) *Attorney, Agent, or Firm* — Fay Sharpe LLP

(57) ABSTRACT

An exemplary method of providing network address translation (NAT) for GPRS tunneling protocol user plane (or GTP-U) traffic on a data center server supporting multiple radio bearers in a mobile network is disclosed. The method includes: receiving packets from a source node via a GTP-U tunnel; filtering ingress GTP-U packets from other types of packets; forwarding a respective ingress GTP-U packet with a public destination IP address to a first queue if a destination IP address matches a defined GTP-U public IP address for the destination node; extracting one or more ingress GTP-U packets and forwarding the packets to a user-land operating system process for inspection; performing NAT of the destination IP address; placing ingress GTP-U packets that have an internal IP address that identifies with a particular radio bearer into a second queue; and forwarding the ingress GTP-U packets via a radio bearer within a network for processing.

15 Claims, 3 Drawing Sheets

(56) References Cited

OTHER PUBLICATIONS

3$^{rd}$ Generation Partnership Project: Technical Specification Group Core Network and Terminals; General Packet Radio Service (GPRS); GPRS Tunnelling Protocol (GTP) across the Gn and Gp interface (Release 11), 3GPP TS 29.060, v11.4.0 (Sep. 2012).

Ayuso, "Netfilter's Connection Tracking System", USENIX The Advanced Computing Systems Association, "login", issue Jun. 2006, vol. 31, No. 3, Article Section: Security, pp. 34-39, Jun. 1, 2006.
Boye, "Netfilter Connection Tracking and NAT Implementation", Proceedings of Seminar on Network Protocols in Operating Systems, Aalto University publication series Science + Technology, Jan. 2013, pp. 34-39, Mar. 23, 2013.
International Search Report dated May 23, 2014.

\* cited by examiner

METHOD AND APPARATUS FOR PROCESSING GPRS TUNNELING PROTOCOL USER PLANE TRAFFIC IN A CLOUD-BASED MOBILE NETWORK

BACKGROUND

The exemplary embodiment relates to a method and apparatus that provides processing, including network address translation, for general packet radio service (GPRS) tunneling protocol user plane traffic on generic data center servers supporting multiple radio bearers in a mobile network. While the exemplary embodiment is particularly directed to the art of wireless telecommunications, and will be thus described with specific reference thereto, it will be appreciated that the exemplary embodiment may have usefulness in other fields and applications.

By way of background, a mobile network operator (also known as a wireless service provider, wireless carrier, cellular company, or mobile network carrier) is a provider of wireless communications services that owns or controls the elements necessary to sell and deliver services to an end user including radio spectrum allocation, wireless network infrastructure, back haul infrastructure, billing, customer care and provisioning computer systems and marketing, customer care, provisioning and repair organization. Mobile network operators' networks are populated with a large and increasing variety of proprietary hardware appliances. To launch a new network service often requires yet another variety of proprietary hardware appliance and finding the space and power to accommodate all these boxes of proprietary hardware appliances is becoming increasingly difficult. This difficulty is often compounded by the increasing costs of energy, capital investment challenges and the rarity of skills necessary to design, integrate and operate increasingly complex hardware-based appliances.

Moreover, hardware-based appliances can rapidly reach their end of life, requiring the procure-design-integrate-deploy cycle of new appliances to be repeated with little or no revenue benefit. Worse yet, hardware lifecycles are becoming shorter as technology and services innovation accelerates, inhibiting the rollout of new revenue earning network services and constraining innovation in an increasingly network-centric connected world.

Thus, there is a need for a method and system that resolves the above-referenced difficulties and others.

SUMMARY OF THE EXEMPLARY EMBODIMENT

In a cloud-based mobile network with multiple nodal elements, such as one or more Radio Network Controllers (or RNCs), running on generic data center servers, with the constraint of a limited number of external public Internet Protocol (IP) addresses available for use by Radio Bearers (RABs), there is a need to have a portable and generic solution to seamlessly support GPRS Tunneling Protocol-User plane (or GTP-U) network address translation without depending on highly specialized hardware and software. A GTP-U tunnel has at least two public IP addresses, i.e., one IP address for each of the endpoints. There are multiple RABs in a system to load balance the tunnels across available resources of a nodal element (e.g., the RNC). Each of the RABs is allocated an identifier, such as a private IP address within the node. As a result, the GTP-U traffic destined to an endpoint with a public IP address generally needs to have its content inspected and its IP address translated to a private IP address before being forwarded to the appropriate RAB to be processed. See 3GPP TS 29.060 for reference.

In this regard, a method and apparatus for providing processing such as network address translation for GPRS tunneling protocol user plane (or GTP-U) traffic on a data center server supporting multiple radio bearers in a mobile network are described herein. Rather than using specialized hardware and software, the exemplary embodiment uses open-source software components, such as Linux IpTables and libipq/nfnetlink_queue modules, for performing network address translation of a GTP-U packet in a cloud-based mobile network using data center servers.

In one aspect, a method of processing GPRS tunneling protocol user plane traffic is provided. The method includes: receiving packets from a source node at a termination endpoint of a destination node via a GPRS tunneling protocol user plane (GTP-U) tunnel; filtering ingress GTP-U packets from other types of packets received at the destination node using an open-source operating system filtering module within an operating system kernel; forwarding a respective ingress GTP-U packet with a public destination IP address to a first queue if a destination IP address matches a defined GTP-U public IP address for the destination node; extracting one or more ingress GTP-U packets from the first queue and forwarding the one or more ingress GTP-U packets to a user-land operating system process for inspection; performing network address translation (NAT) of the destination IP address on the one or more ingress GTP-U packets; placing at least one of the one or more ingress GTP-U packets that have an internal IP address that identifies with a particular radio bearer into a second queue; and forwarding the at least one of the one or more ingress GTP-U packets via a radio bearer within a network for processing using an IP forwarding capability of the operating system kernel.

In another aspect, a system for processing GPRS tunneling protocol user plane traffic is provided. The system includes: one or more servers that are configured to perform various functions. These functions include: receiving packets from a source node at a termination endpoint of a destination node via a GPRS tunneling protocol user plane (GTP-U) tunnel; filtering ingress GTP-U packets from other types of packets received at the destination node using an open-source operating system filtering module within an operating system kernel; forwarding a respective ingress GTP-U packet with a public destination IP address to a first queue if a destination IP address matches a defined GTP-U public IP address for the destination node; extracting one or more ingress GTP-U packets from the first queue and forwarding the one or more ingress GTP-U packets to a user-land operating system process for inspection; performing network address translation (NAT) of the destination IP address on the one or more ingress GTP-U packets; placing at least one of the one or more ingress GTP-U packets that have an internal IP address that identifies with a particular radio bearer into a second queue; and forwarding the at least one of the one or more ingress GTP-U packets via a radio bearer within a network for processing using an IP forwarding capability of the operating system kernel.

In yet another aspect, a non-transitory computer-usable data carrier storing instructions that, when executed by a computer, cause the computer to perform a method is provided. The method includes: receiving packets from a source node at a termination endpoint of a destination node via a GPRS tunneling protocol user plane (GTP-U) tunnel; filtering ingress GTP-U packets from other types of packets received at the destination node using an open-source operating system filtering module within an operating system kernel; forwarding a respective ingress GTP-U packet with a public destination IP address to a first queue if a destination IP address matches a defined GTP-U public IP address for the destination node; extracting one or more ingress GTP-U packets from the first queue and forwarding the one or more ingress GTP-U packets to a user-land operating system process for inspection; performing network address translation (NAT) of the destination IP address on the one or more ingress GTP-U packets; placing at least one of the one or more ingress GTP-U packets that have an internal IP address that identifies with a particular radio bearer into a second queue; and forwarding the at least one of the one or more ingress GTP-U packets via a radio bearer within a network for processing using an IP forwarding capability of the operating system kernel.

Optionally, the exemplary method further include performing network address translation of the source IP address of egress GTP-U packets from a radio bearer via the open-source operating system filtering module before forwarding the egress GTP-U packets to an external network. In other embodiments, the source node comprises a serving GPRS support node, the destination node comprises a radio network controller, the operating system comprises an open-source operating system, and/or the open-source operating system comprises Linux.

Further scope of the applicability of the present exemplary embodiment will become apparent from the detailed description provided below. It should be understood, however, that the detailed description and specific examples, while indicating preferred embodiments, are given by way of illustration only, since various changes and modifications within the spirit and scope of the exemplary embodiment will become apparent to those skilled in the art.

DESCRIPTION OF THE DRAWINGS

The present exemplary embodiment exists in the construction, arrangement, and combination of the various parts of the device, and steps of the method, as hereinafter more fully set forth, specifically pointed out in the claims, and illustrated in the accompanying drawings in which:

DETAILED DESCRIPTION

Figure 1:
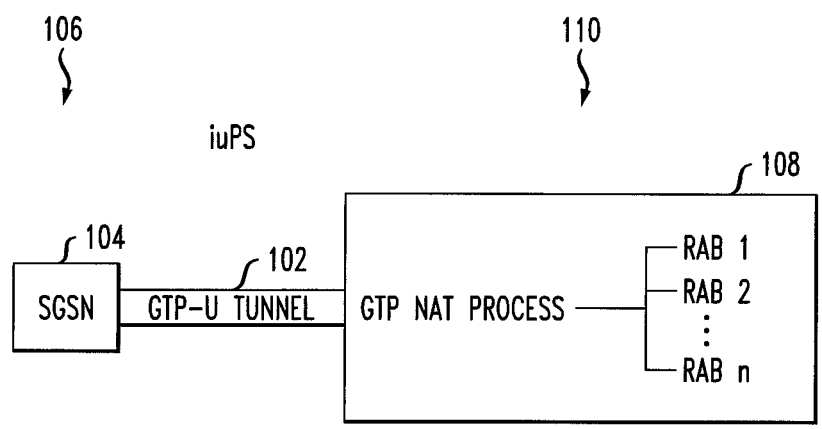
FIG. 1 is a block diagram depicting an illustrative GTP-U tunnel between a source and a destination.

Referring now to the drawings wherein the showings are for purposes of illustrating the exemplary embodiments only and not for purposes of limiting the claimed subject matter, FIG. 1 provides a view of an exemplary system into which the presently described embodiments may be incorporated. As shown generally, FIG. 1 shows a GTP-U tunnel 102 between a source 104, such as a serving general packet radio service support node (or SGSN), in a network 106, such as a Packet Switched Core Network, and a destination 108, such as a radio network controller (or RNC) in a cloud-based mobile network 110, such as a Radio Access Network provided by a mobile network operator. It is to be understood, however, that the network 106 generally includes other components, but for simplicity only an SGSN is discussed below. Likewise, the cloud-based mobile network 110 includes generally other components, but for simplicity only a cloud-based RNC is discussed below.

As used herein, the terms "cloud-based computing," "cloud-based Radio Access Network," and the like refer to the use of computing resources (hardware and software) that are delivered as a service over a network (typically the Internet), such as through Network Functions Virtualization or other implementations.

Network Functions Virtualization incorporates Information Technology (IT) virtualization technology to consolidate many network equipment types onto industry standard high volume servers, switches and storage, which could be located in data centers, network nodes and in the end user premises. Network Functions Virtualization is applicable to various types of data plane packet processing and control plane function in fixed and mobile network infrastructures. Further, Network Functions Virtualization is complementary to Software Defined Networking (SDN). Network Functions can be virtualized and deployed without SDN being required and vice-versa.

General packet radio service (or GPRS) is a carrier service for various wireless networks, including, but not limited to, the global system for mobile communication (or GSM), the Universal Mobile Telecommunications System (or UMTS), which is a third generation (3G) mobile cellular system for networks based on the GSM standard), and Long Term Evolution, (or 4G LTE), which is based on the GSM/Enhanced Data Rate for GSM Evolution (EDGE) and UMTS/High Speed Packet Access (HSPA) network technologies. GPRS enhances and simplifies wireless access to packet data networks for mobile network operators. GPRS architecture generally uses a radio-packet technique to transfer user data packets in an efficient way between, for example, GPRS support nodes and external data networks.

A GPRS support node (or GSN) is a network node that supports the use of GPRS in the core network. GSNs typically include a Gn interface and support the GPRS tunneling protocol. There are at least two variants of the GSN, namely, the Gateway GPRS support node and the Serving GPRS support node. Of relevance here is the Serving GPRS support node (or SGSN) 104, which is typically responsible for the delivery of data packets from and to the mobile stations within its geographical service area. The SGSN's tasks may include packet routing and transfer, mobility management (attach/detach and location management), logical link management, and authentication and charging functions. The location register of the SGSN 104 generally stores location information, such as current cell or current Visitor Location Register (or VLR), and user profiles, such as International Mobile Subscriber Identity or address(es) used in the packet data network, of GPRS users registered with this SGSN. As used herein, an International Mobile Subscriber Identity or IMSI refers a unique identification associated with all GSM, UMTS and LTE network SIM cards.

GPRS Tunneling Protocol (GTP) is a group of IP-based communications protocols used to carry GPRS within GSM, UMTS, LTE or other networks. GTP allows multiprotocol packets to be tunneled through a GPRS backbone. GTP is the primary protocol used in the GPRS core network. It is the protocol which allows end users of a GSM, UMTS, LTE, or other network to move from place to place while continuing to connect to the Internet as if from one location at the gateway GRPS support node (GGSN). The protocol does this by carrying the subscriber's data from the subscriber's current SGSN to the GGSN that is handling the subscriber's session. GTP can be decomposed into separate protocols, such as GTP-C, GTP-U and GTP'. GTP-C is used within the GPRS core network for signaling between gateway GPRS support nodes (GGSN) and serving GPRS support nodes (SGSN). GTP' (GTP prime) uses the same message structure as GTP-C and GTP-U, but has an independent function. It can be used for carrying charging data from the charging data function (CDF) of the GSM or UMTS network to the charging gateway function (CGF). GTP-U is used for carrying user data within the GPRS core network and between the radio access network and the core network. The user data transported can be packets in any of IPv4, IPv6, or Point-to-Point (PPP) formats.

Of relevance here is GTP-U, which is, in effect a relatively simple IP-based tunneling protocol that permits many tunnels between each set of end points. When used in UMTS, for example, each subscriber will typically have one or more tunnels, one for each PDP context that is active, as well as possibly having separate tunnels for specific connections with different quality of service requirements. The separate tunnels are identified by a TEID (Tunnel Endpoint Identifier) in the GTP-U messages, which is preferably a dynamically allocated random number.

Different GTP variants are implemented by RNCs, SGSNs, GGSNs and CGFs within 3GPP networks. GPRS mobile stations (MSs) are generally connected to a SGSN without being aware of GTP.

Each RNC 108 typically operates to control and coordinate the one or more base stations (not shown) to which it is connected. In this regard, the RNC 108 of FIG. 1 may provide, for example, replication, communications, runtime, and system management services. The RNC 108, in the illustrated embodiment, may also handle call processing functions, such as setting and terminating a call path and is capable of determining a data transmission rate on the forward and/or reverse link for each mobile station (not shown) and for each sector supported by each of the base stations.

The logical connections between network elements are known as interfaces. The UMTS Iu interface enables interconnection of Radio Network Controllers (RNCs) with Core Network nodes. The IuPS interface relates to the Packet Switched domain and the IuCS interface relates to the Circuit Switched domain. The IuPS interface typically provides interconnection between the SGSN and the RNC network nodes in the UMTS/3G network, while the IuCS interface (not shown) interconnects the MSC/VLR and the RNC network nodes. On the Iu interface, the Radio Access Network Application Part (RANAP) protocol and the signaling part of GTP-U generally perform the control functions for the user plane (GTP-U).

Figure 2:
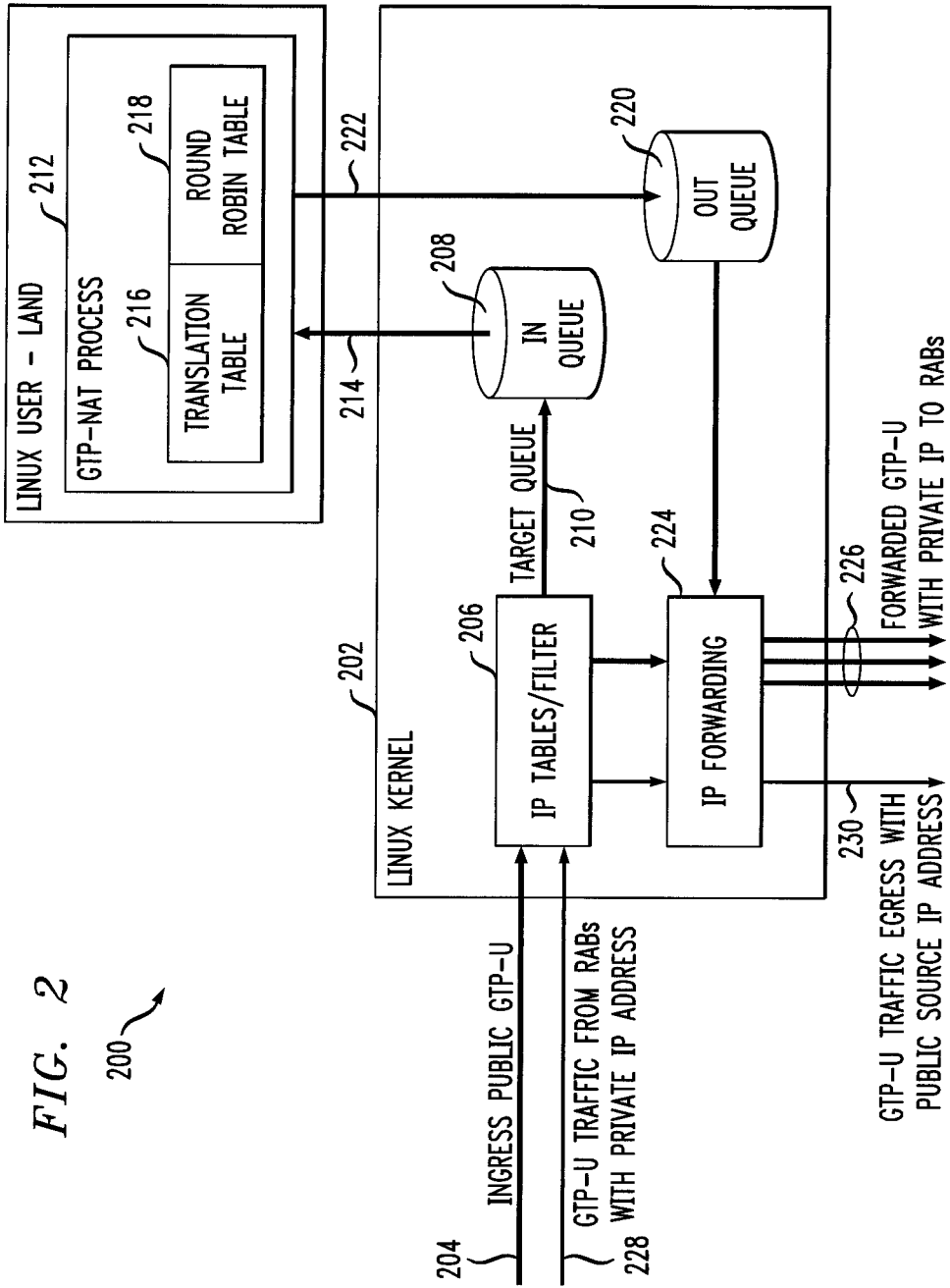
FIG. 2 is a flow diagram illustrating GTP-U processing in accordance with aspects of the exemplary embodiment.
Figure 3:
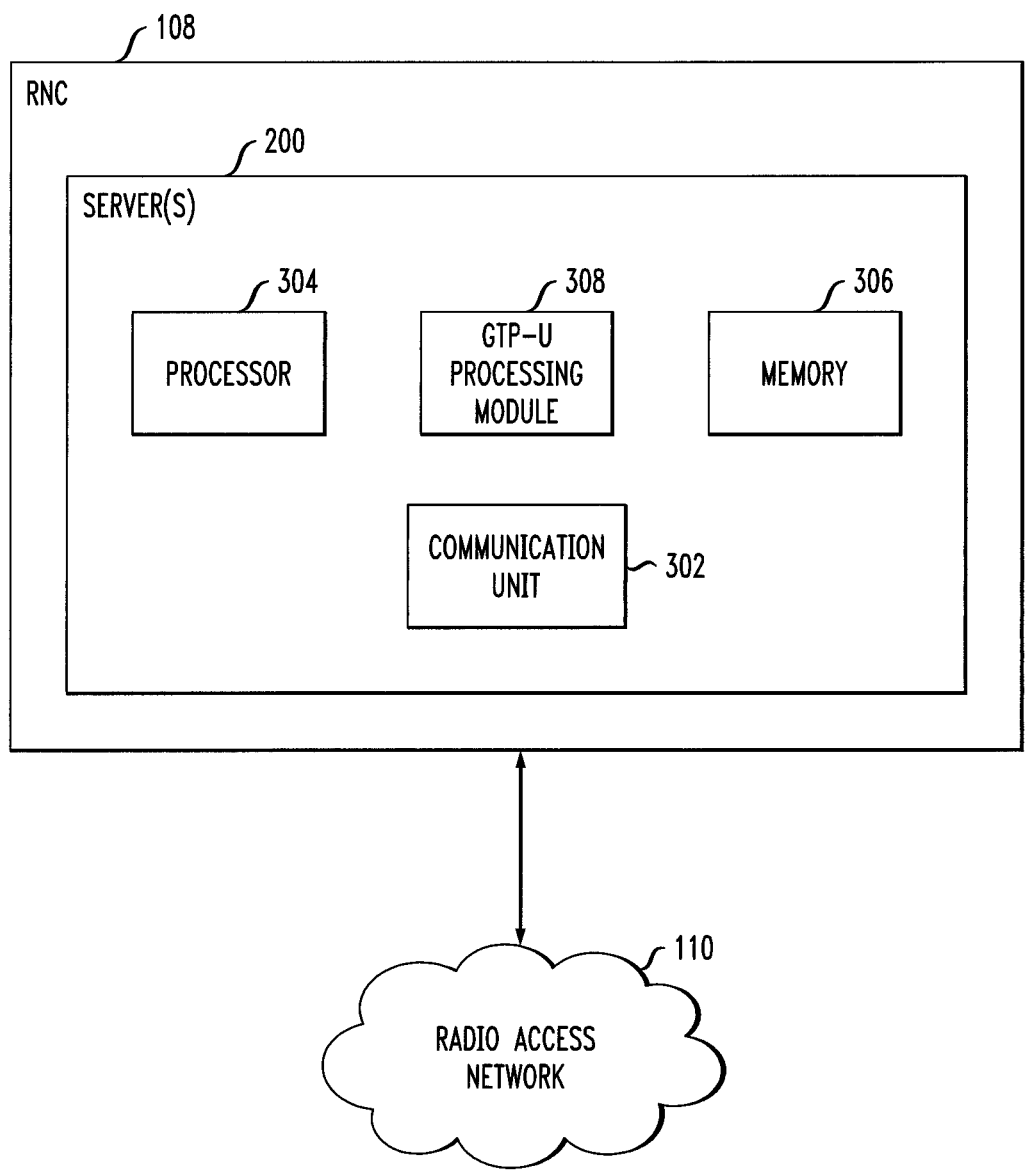
FIG. 3 depicts a high-level block diagram of a general purpose server suitable for use in performing the functions described herein.

FIG. 2 illustrates an exemplary method of processing GTP-U traffic (or packets) in a generic data center server 200 (i.e., one of the servers that makes up a nodal element such as the RNC 108) supporting multiple radio bearers (RABs) in a cloud-based mobile network. Thus, the server 200 is the destination, and the source may be a nodal element such as the SGSN 102. However, it is to be understood that the destination and/or the source may be other nodal elements in the network. As described above, there is a GTP-U tunnel between the source and the destination. Thus, the exemplary method for GTP-U packet processing may be implemented in one or more of the servers 200 that comprise, for example, the RNC 108 located in the radio access network 110.

In the exemplary embodiment, an open-source software system, such as Linux, is preferably used to implement various functions as described below. However, it is to be understood that other types of open-source software besides Linux may be used. As used herein, the term open-source software (OSS) refers to computer software that is available with source code. That is, the source code and certain other rights normally reserved for copyright holders are provided under an open-source license that permits users to study, change, improve and at times also to distribute the software. Linux is a Unix-like computer operating system assembled under the model of free and open source software development and distribution.

Returning now to FIG. 2, initially, packets, which suitably include a public GTP-U destination IP address, are received from the source node (e.g., the SGSN 102) at the operating system kernel 202 (e.g., the Linux kernel) (204). The GTP-U packets received at the operating system kernel 202 of the destination node are filtered from other traffic by a firewall/Network Address Translation (NAT) component 206, such as Linux IpTables. Alternatively, Linux sockets could be used to catch matching destination IP addresses.

As used herein, the term "network address translation" (or NAT) refers to the process of modifying IP address information in IP packet headers while in transit across a traffic routing device. Further, with regard to the Linux operating system, the term "Netfilter" refers to a set of hooks inside the Linux kernel that allows kernel modules to register callback functions with the network stack. A registered callback function is then called back for every packet that traverses the respective hook within the network stack. Iptables is a generic table structure for the definition of rulesets. Each rule within an IP table consists of a number of classifiers (e.g., IpTables matches) and one connected action (e.g., IpTables target).

A GTP-U packet with a public destination IP address is then placed into a target queue (or "in queue") 208, if the destination IP matches the defined GTP-U public IP address for the node (or network element) (210). In 3G networks, for example, the node may be any one of a number of network elements, such as an RNC, a GGSN, an SGSN, or a NodeB. By way of example, a particular IP address belonging to an RNC will be extracted to an RNC, a particular IP address IP belonging to a GGSN would be extracted to a GGSN, and so on. Further, the exemplary method could be run (i.e., used) on any of the GSN nodes to extract the GTP-U packets that belong to itself. For example, the RNC would not be extracting packets with an IP address belonging to other GSNs.

It is to be understood that memory generally consists of RAM (random access memory) cells, whose contents can be accessed (i.e., read and written to) at extremely high speeds but are retained only temporarily (i.e., while in use or, at most, while the power supply remains on). Its purpose is to hold programs and data that are currently in use and thereby serve as a high speed intermediary between the CPU (central processing unit) and the much slower storage, which most commonly consists of one or more hard disk drives (HDDs). Thus, "user space" is that set of memory locations in which user processes (i.e., everything other than the kernel) run. A process is an executing instance of a program. One of the roles of the kernel is to manage individual user processes within this space and to prevent them from interfering with each other.

Kernel space can be accessed by user processes only through the use of system calls. System calls are requests in a Unix-like operating system by an active process for a service performed by the kernel, such as input/output (I/O) or process creation. An active process is a process that is currently progressing in the CPU, as contrasted with a process that is waiting for its next turn in the CPU. I/O is any program, operation or device that transfers data to or from a CPU and to or from a peripheral device (such as disk drives, keyboards, mice and printers).

Similarly, the term "user-land" refers to all application software that runs in user space. User-land usually refers to the various programs and libraries that the operating system uses to interact with the kernel, i.e., software that performs input/output, manipulates file system objects, etc. In this regard, system memory in Linux can be divided into two distinct regions: kernel space and user space. Kernel space is where the kernel (i.e., the core of the operating system) executes (i.e., runs) and provides its services.

Returning now to FIG. 2, a user-land (i.e., anywhere outside the kernel) process 212, including, but not limited to, a GTP-NAT process, may be utilized to retrieve the packet(s) from the in queue 208 for processing (214), such as by modifying the destination header and content of the packet(s) based on some implementation dependent criteria in order to support a standard such as 3GPP TS 29.060. The GTP-NAT process may include, for example, a translation table 216 and/or a round robin table 218. As used herein, a round robin table refers to a software component that fairly distributes across available multi-RAB resources within the node.

A packet with an internal or private IP address that, for example, identifies with a particular RAB is then placed into an "out queue" 220 (222). The packet from the out queue is forwarded over the fabric/router 224 that connects a data server blade to a RAB processor (not shown) in another blade (226). As used herein, a server blade refers to a single circuit board populated with components such as processors, memory, and network connections that are usually found on multiple boards. Server blades are designed to slide into existing servers. Server blades are more cost-efficient, smaller and consume less power than traditional box-based servers.

For egress GTP-U traffic, internal GTP-U traffic with an RAB private source IP address coming from an RAB (228), for example, is generally filtered by a component such as IpTables 206, which matches the internal or private source IP address to the source IP address in the IP header of the GTP-U packet. IpTables 206 may perform source IP address translation on the packet from a private IP to the GTP-U public IP address and forwarded out to the external IP network (230).

As noted above, the destination node 108 (e.g., an RNC) may be embodied by one or more data center servers 200 connected to the radio access network 110. Each of the servers 200 includes one or more of a communications unit 302, a processor 304, a memory 306, and the like. The communications units 302 allow the servers 200 to interact with other components connected to the radio access network 110. The memories 306 include computer executable instructions for performing the above-noted functions associated with the destination node 108. The processors 304 execute the computer executable instructions on the memories 306. Further, in certain embodiments, the servers 200 include a GTP-U packet processing module 308. The GTP-U packet processing module 308 may be embodied by computer executable instructions stored on computer readable media, wherein the processors 304 execute the computer executable instructions. In some embodiments, the computer readable media may be the memories 306.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

The above description merely provides a disclosure of particular embodiments and is not intended for the purposes of limiting the same thereto. As such, the exemplary embodiment is not limited to only the above-described embodiments. Rather, it is recognized that one skilled in the art could conceive alternative embodiments that fall within the scope of the exemplary embodiment.

We claim:

1. A method of processing general packet radio service (GPRS) tunneling protocol user plane traffic, the method comprising:

receiving packets from a source node at a termination endpoint of a destination node via a GPRS tunneling protocol user plane (GTP-U) tunnel;

filtering ingress GTP-U packets from other types of packets received at the destination node using an open-source operating system filtering module within an operating system kernel;

forwarding a respective ingress GTP-U packet with a public destination IP address to a first queue if a destination IP address matches a defined GTP-U public IP address for the destination node;

extracting one or more ingress GTP-U packets from the first queue and forwarding the one or more ingress GTP-U packets to a user-land operating system process for inspection;

performing network address translation (NAT) of the destination IP address on the one or more ingress GTP-U packets, wherein the performing NAT includes load balancing across a plurality of radio bearers;

placing at least one of the one or more ingress GTP-U packets that have an internal IP address that identifies with a particular radio bearer into a second queue;

forwarding the at least one of the one or more ingress GTP-U packets via the particular radio bearer within a network for processing using an IP forwarding capability of the operating system kernel;

performing network address translation of a source IP address of egress GTP-U packets from a radio bearer via the open-source operating system filtering module before forwarding the egress GTP-U packets to an external network.

2. The method of claim 1, wherein the source node comprises a serving GPRS support node.

3. The method of claim 1, wherein the destination node comprises a radio network controller.

4. The method of claim 1, wherein the operating system comprises an open-source operating system.

5. The method of claim 4, wherein the open-source operating system comprises Linux.

6. A system for processing GPRS tunneling protocol user plane traffic, the system comprising:
one or more servers configured to:
receive packets from a source node at a termination endpoint of a destination node via a GPRS tunneling protocol user plane (GTP-U) tunnel;
filter ingress GTP-U packets from other types of packets received at the destination node using an open-source operating system filtering module within an operating system kernel;
forward a respective ingress GTP-U packet with a public destination IP address to a first queue if a destination IP address matches a defined GTP-U public IP address for the destination node;
extract one or more ingress GTP-U packets from the first queue and forwarding the one or more ingress GTP-U packets to a user-land operating system process for inspection;
perform network address translation (NAT) of the destination IP address on the one or more ingress GTP-U packets, wherein the performing NAT includes load balancing across a plurality of radio bearers;
place at least one of the one or more ingress GTP-U packets that have an internal IP address that identifies with a particular radio bearer into a second queue;
forward the at least one of the one or more ingress GTP-U packets via the particular radio bearer within a network for processing using an IP forwarding capability of the operating system kernel;
perform network address translation of a source IP address of egress GTP-U packets from a radio bearer via the open-source operating system filtering module before forwarding the egress GTP-U packets to an external network.

7. The system of claim 6, wherein the source node comprises a serving GPRS support node.

8. The system of claim 6, wherein the destination node comprises a radio network controller.

9. The system of claim 6, wherein the operating system comprises an open-source operating system.

10. The system of claim 9, wherein the open-source operating system comprises Linux.

11. A non-transitory computer-usable data carrier storing instructions that, when executed by a computer, cause the computer to perform a method comprising:
receiving packets from a source node at a termination endpoint of a destination node via a GPRS tunneling protocol user plane (GTP-U) tunnel;
filtering ingress GTP-U packets from other types of packets received at the destination node using an open-source operating system filtering module within an operating system kernel;
forwarding a respective ingress GTP-U packet with a public destination IP address to a first queue if a destination IP address matches a defined GTP-U public IP address for the destination node;
extracting one or more ingress GTP-U packets from the first queue and forwarding the one or more ingress GTP-U packets to a user-land operating system process for inspection;
performing network address translation (NAT) of the destination IP address on the one or more ingress GTP-U packets, wherein the performing NAT includes load balancing across a plurality of radio bearers;
placing at least one of the one or more ingress GTP-U packets that have an internal IP address that identifies with a particular radio bearer into a second queue;
forwarding the at least one of the one or more ingress GTP-U packets via the particular radio bearer within a network for processing using an IP forwarding capability of the operating system kernel;
performing network address translation of a source IP address of egress GTP-U packets from a radio bearer via the open-source operating system filtering module before forwarding the egress GTP-U packets to an external network.

12. The non-transitory computer-usable data carrier of claim 11, wherein the source node comprises a serving GPRS support node.

13. The non-transitory computer-usable data carrier of claim 11, wherein the destination node comprises a radio network controller.

14. The non-transitory computer-usable data carrier of claim 11, wherein the operating system comprises an open-source operating system.

15. The non-transitory computer-usable data carrier of claim 14, wherein the open-source operating system comprises Linux.

* * * * *